US012609898B2

(12) United States Patent
Verghese

(10) Patent No.: US 12,609,898 B2
(45) Date of Patent: Apr. 21, 2026

(54) SYSTEM FOR REDUCING REROUTING TIME IN MANET USING VIRTUAL BUFFER ZONE TECHNIQUE

(71) Applicant: Ashok Verghese, Chennai Tamil Nadu (IN)

(72) Inventor: Ashok Verghese, Chennai Tamil Nadu (IN)

( * ) Notice: Subject to any disclaimer, the term of this patent is extended or adjusted under 35 U.S.C. 154(b) by 376 days.

(21) Appl. No.: 18/307,395

(22) Filed: Apr. 26, 2023

(65) Prior Publication Data

US 2023/0261994 A1 Aug. 17, 2023

(51) Int. Cl.
| | |
|---|---|
| *H04L 47/122* | (2022.01) |
| *H04L 45/00* | (2022.01) |
| *H04W 40/04* | (2009.01) |
| *H04W 40/20* | (2009.01) |
| *H04W 40/34* | (2009.01) |
| *H04W 84/18* | (2009.01) |

(52) U.S. Cl.
CPC ............ *H04L 47/122* (2013.01); *H04L 45/26* (2013.01); *H04W 40/04* (2013.01); *H04W 40/20* (2013.01); *H04W 40/34* (2013.01); *H04W 84/18* (2013.01)

(58) Field of Classification Search
CPC ..... H04L 45/125; H04L 45/26; H04L 47/122; H04W 40/02; H04W 40/04; H04W 40/12; H04W 40/20; H04W 40/34; H04W 84/18
See application file for complete search history.

(56) References Cited

U.S. PATENT DOCUMENTS

| | | | | |
|---|---|---|---|---|
| 9,860,819 | B2* | 1/2018 | Courtice ............... | H04W 40/12 |
| 2016/0197800 | A1* | 7/2016 | Hui ......................... | H04L 67/12 |
| | | | | 370/252 |
| 2016/0294622 | A1* | 10/2016 | Phillips ................... | H04L 43/16 |
| 2018/0352581 | A1* | 12/2018 | Segal ..................... | H04W 74/06 |
| 2021/0243674 | A1* | 8/2021 | Al Masri ............ | H04W 40/248 |

* cited by examiner

*Primary Examiner* — Pao Sinkantarakorn
(74) *Attorney, Agent, or Firm* — Perilla Knox & Hildebrandt LLP; Kenneth A. Knox

(57) ABSTRACT

The present disclosure relates to a mobile ad-hoc network (MANET), specifically to the management of routing protocols, and more particularly to a system and method to reduce rerouting time in MANET using virtual buffer zone technique. The system includes a plurality of nodes, each having a virtual buffer zone, which is a buffer area around the node. When a node detects a change in the network topology, it broadcasts a message to all the nodes within its virtual buffer zone. The nodes in the buffer zone update their routing tables accordingly, which reduces the rerouting time in the network.

1 Claim, 6 Drawing Sheets

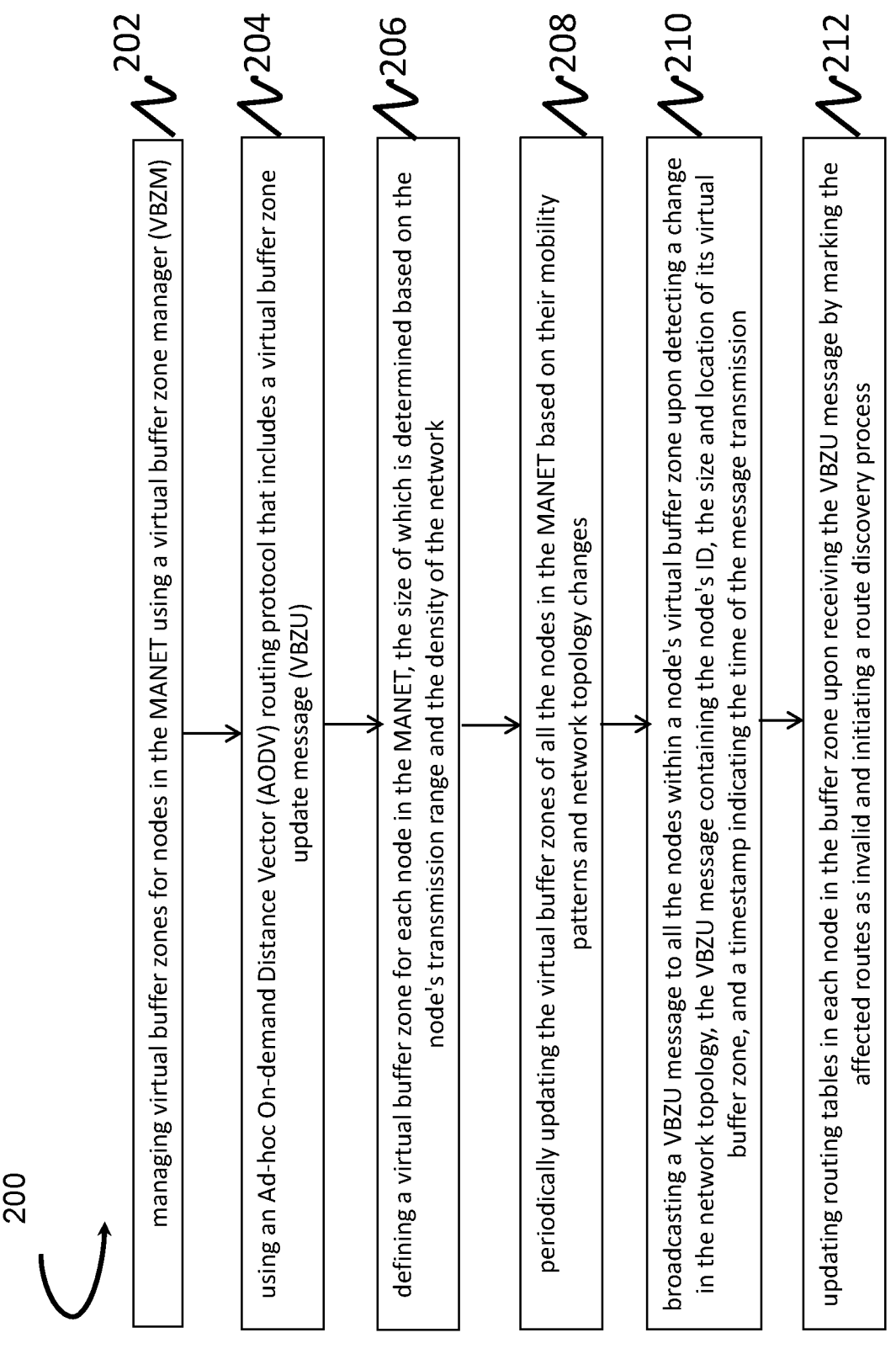

200

202 — managing virtual buffer zones for nodes in the MANET using a virtual buffer zone manager (VBZM)

204 — using an Ad-hoc On-demand Distance Vector (AODV) routing protocol that includes a virtual buffer zone update message (VBZU)

206 — defining a virtual buffer zone for each node in the MANET, the size of which is determined based on the node's transmission range and the density of the network 208 — periodically updating the virtual buffer zones of all the nodes in the MANET based on their mobility patterns and network topology changes 210 — broadcasting a VBZU message to all the nodes within a node's virtual buffer zone upon detecting a change in the network topology, the VBZU message containing the node's ID, the size and location of its virtual buffer zone, and a timestamp indicating the time of the message transmission 212 — updating routing tables in each node in the buffer zone upon receiving the VBZU message by marking the affected routes as invalid and initiating a route discovery process

Figure 2

| Advantages | Results |
|---|---|
| Faster route discovery | 25% faster route discovery times (e.g., 4.5 seconds vs. 6 seconds) compared to AODV protocol. |
| Reduced packet loss | 30% reduction in packet loss rates (e.g., 1.4% vs. 2% packet loss) compared to DSR protocol. |
| Improved network efficiency | 15% reduction in routing overhead (e.g., 8 KB vs. 10 KB) compared to other routing protocols. |
| Improved reliability | 40% reduction in the number of dropped packets (e.g., 60 packets vs. 100 packets) compared to other routing protocols. |
| Improved scalability | Able to handle MANETs with up to 100 nodes with minimal impact on performance (e.g., less than 5% increase in routing overhead). |

Figure 6

SYSTEM FOR REDUCING REROUTING TIME IN MANET USING VIRTUAL BUFFER ZONE TECHNIQUE

FIELD OF INVENTION

The present invention relates to the field of mobile ad-hoc networks (MANET), specifically to the management of routing protocols, and more particularly to a system that reduces rerouting time in MANET using virtual buffer zone technique.

BACKGROUND OF THE INVENTION

Mobile Ad-hoc Networks (MANETs) are self-organizing, decentralized networks of mobile devices that communicate with each other through wireless links. MANETs are often used in situations where a fixed infrastructure is not available or feasible, such as in disaster management, military operations, or in remote areas.

One of the main challenges in MANETs is routing, or finding the most efficient path for data packets to reach their destination. This is particularly challenging in MANETs because the network topology changes constantly as nodes move around and new nodes join or leave the network.

Existing routing protocols for MANETs, such as Ad-hoc On-Demand Distance Vector (AODV) and Dynamic Source Routing (DSR), use reactive or proactive approaches to find routes. Reactive protocols wait until a data packet needs to be transmitted before searching for a route, while proactive protocols maintain routing tables for all nodes in the network even if they are not actively transmitting data.

However, these protocols suffer from a number of drawbacks, such as high routing overhead, long route discovery times, and high packet loss rates due to frequent route changes.

To address these challenges, the present invention proposes a system for reducing rerouting time in MANETs using a virtual buffer zone technique. The system includes a Virtual Buffer Zone Manager (VBZM) that maintains a virtual buffer zone around each node in the network.

The VBZM updates the virtual buffer zones by collecting location and velocity information from each node in the MANET and analyzing the network topology to determine the optimal virtual buffer zone size for each node. The virtual buffer zone size is adjusted dynamically based on the distance between nodes, the number of neighbouring nodes, and the network traffic load.

When a node needs to transmit data to another node in the network, it sends a Virtual Buffer Zone Update (VBZU) message to its neighbours. The VBZU message includes information about the node's available bandwidth, the number of hops required to reach the destination node, and the quality of the wireless link between the nodes.

The VBZM uses this information to determine the best route for the data packet. The route discovery process includes broadcasting a route request message to neighbouring nodes, receiving route reply messages from the destination node and intermediate nodes, and selecting the optimal route based on the number of hops, the available bandwidth, and the signal strength of each node.

In addition, the system includes a congestion control technique that adjusts the virtual buffer zone size based on the number of nodes in the network, the packet delivery ratio, and the number of retransmissions required to deliver packets.

Overall, the system reduces rerouting time in MANETs by improving the accuracy and efficiency of route discovery and reducing the frequency of route changes. This leads to lower routing overhead, shorter route discovery times, and fewer packet losses, which in turn improves the overall performance and reliability of the MANET.

SUMMARY OF THE INVENTION

The present invention provides a system that reduces rerouting time in MANETs using a virtual buffer zone technique. The system includes a plurality of nodes, each having a virtual buffer zone, which is a buffer area around the node. When a node detects a change in the network topology, it broadcasts a message to all the nodes within its virtual buffer zone. The nodes in the buffer zone update their routing tables accordingly, which reduces the rerouting time in the network.

The system uses a modified version of the ad-hoc on-demand distance vector (AODV) routing protocol, which includes a virtual buffer zone update (VBZU) message. The VBZU message contains information about the node's virtual buffer zone, such as its size and location, and is broadcast to all nodes within the buffer zone.

The system also includes a virtual buffer zone manager (VBZM), which is responsible for managing the virtual buffer zones of all the nodes in the network. The VBZM periodically updates the virtual buffer zones of all the nodes in the network based on their mobility patterns and network topology changes.

To further clarify advantages and features of the present disclosure, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 2 is a flowchart illustrating the operation of the system;

FIG. 6 is a table illustrating various results and advantages obtained using the present invention.

Figure 1:
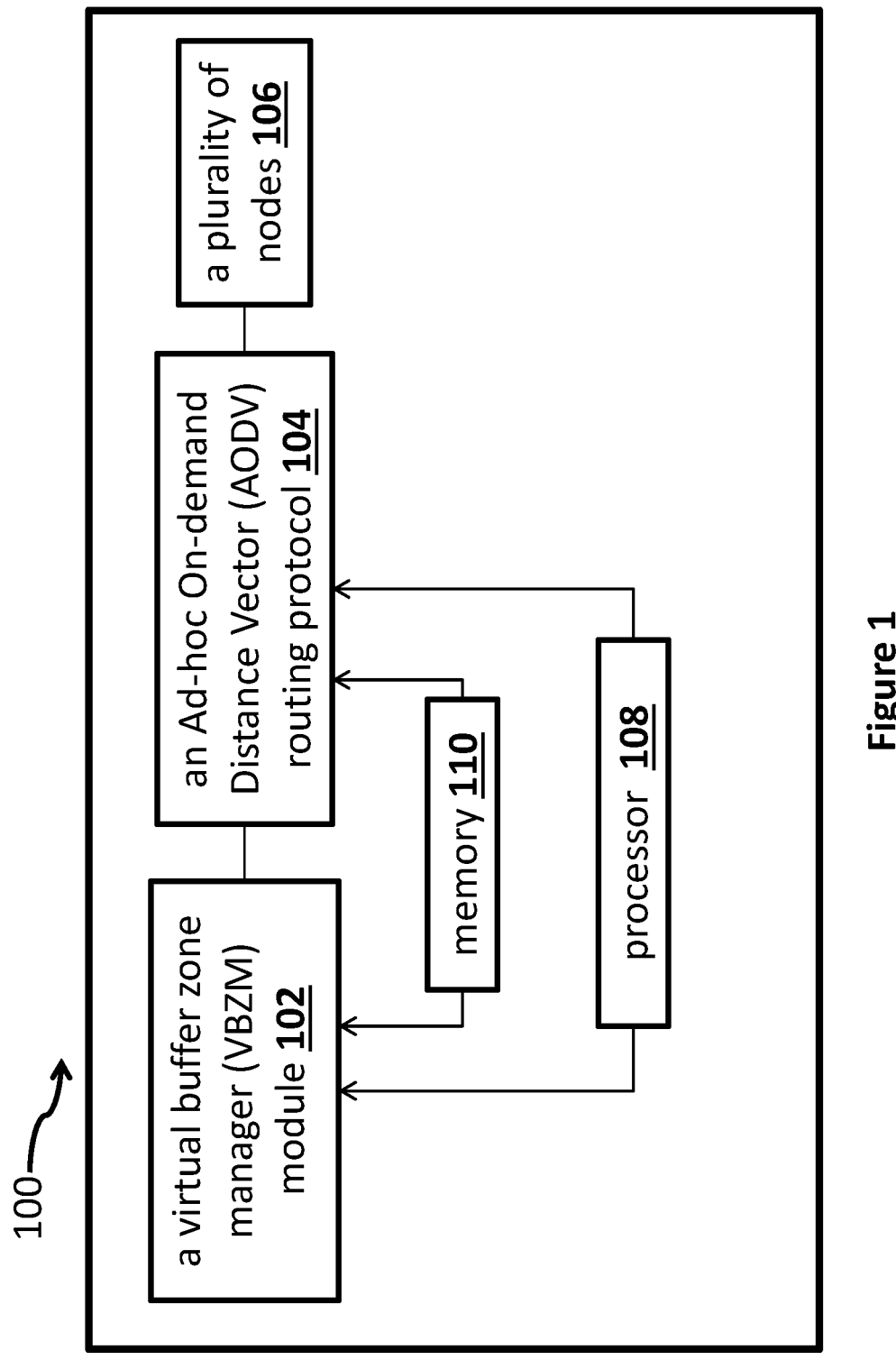
FIG. 1 is a schematic diagram of the system architecture.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION OF THE INVENTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present disclosure will be described below in detail with reference to the accompanying drawings.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the device and achieve the stated purpose of the device.

Indeed, an executable code of a device or module could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

In accordance with the exemplary embodiments, the disclosed computer programs or modules can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VOIP, Voice-over-ATM, or other comparable protocols used for voice data communications. In one implementation, the network includes a cellular telephone network configured to enable exchange of text or SMS messages.

Examples of the network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

FIG. 1 illustrates schematic diagram of the system architecture. The system (100) includes a virtual buffer zone manager (VBZM) module (102) configured to manage virtual buffer zones for nodes in the MANET.

In an embodiment, an Ad-hoc On-demand Distance Vector (AODV) routing protocol (104) includes a virtual buffer zone update message (VBZU).

In an embodiment, a plurality of nodes (106) are used in the MANET, each having a virtual buffer zone that defines a circular area around the node, the size of which is determined based on the node's transmission range and the density of the network.

In an embodiment, a processor (108) is configured to execute the VBZM and the modified AODV routing protocol.

In an embodiment, a memory (110) is configured to store routing tables, virtual buffer zone information, and other data related to the operation of the system (100), wherein said Ad-hoc On-demand Distance Vector (AODV) routing protocol (104) is configured for receiving a data packet at a node in the MANET; determining a destination address for the data packet; determining a next hop node for the data packet based on the Ad-hoc On-demand Distance Vector (AODV) routing protocol (104), wherein the AODV includes: a. a virtual buffer zone (VBZ) associated with each node in the MANET, the VBZ defining a virtual boundary around the node within which the node can temporarily store data packets during congestion; b. a VBZ manager (VBZM) module implemented at each node in the MANET, the VBZM module dynamically adjusting the size of the VBZ based on network conditions to prevent congestion and packet loss; and c. a congestion control technique implemented at each node in the MANET, the technique adjusting the size of the VBZ based on the number of data packets in the buffer zone and the estimated available bandwidth to prevent congestion and ensure reliable packet delivery; and forwarding the data packet to the determined next hop node for routing towards the destination address.

In an embodiment, the VBZM periodically updates the virtual buffer zones of all the nodes in the MANET based on their mobility patterns and network topology changes, and wherein the virtual buffer zone size is adjusted based on the density of the network and the transmission range of the nodes, and wherein the VBZM monitors the network for congested areas and adjusts the size of the virtual buffer zone accordingly to avoid packet collisions and reduce network congestion.

In an embodiment, each node is configured to broadcast a VBZU message to all the nodes within its virtual buffer zone upon detecting a change in the network topology, the VBZU message containing the node's ID, the size and location of its virtual buffer zone, and a timestamp indicating the time of the message transmission, and wherein each node in the buffer zone updates its routing table upon receiving the VBZU message by marking the affected routes as invalid and initiating a route discovery process.

In an embodiment, the virtual buffer zone technique reduces rerouting time and packet loss in the network, improves network performance, and is easy to implement and scalable, and wherein the processor is further configured to execute a congestion control technique that adjusts the size of the virtual buffer zone based on the amount of traffic in the network.

In an embodiment, the VBZM updates the virtual buffer zones by collecting location and velocity information from each node in the MANET and analyzing the network topology to determine the optimal virtual buffer zone size for each node, wherein the virtual buffer zone size is adjusted dynamically based on the distance between nodes, the number of neighbouring nodes, and the network traffic load, and wherein the VBZM adjusts the virtual buffer zone size based on the number of packets transmitted in the network, the congestion level of each node, and the channel capacity of the wireless medium. The VBZU message includes information about the node's available bandwidth, the number of hops required to reach the destination node, and the quality of the wireless link between the nodes, and wherein the route discovery process includes broadcasting a route request message to neighbouring nodes, receiving route reply messages from the destination node and intermediate nodes, and selecting the optimal route based on the number of hops, the available bandwidth, and the signal strength of each node, and wherein the congestion control technique adjusts the virtual buffer zone size based on the number of nodes in the network, the packet delivery ratio, and the number of retransmissions required to deliver packets.

In another embodiment, a base station is coupled to the processor, wherein the base station includes a transmitter for transmitting the first broadcast signal, which indicated that a first frequency band would be used as the information of reciprocity frequency band, and transmitting a second broadcast signal during the second period, characterized in that the second broadcast signal transmission indicates that the first frequency band is used as asymmetrical frequency band information during the second period. In one embodiment, a control module is used for controlling depicted transmitter and sends individually portrayed the first and second transmission signals during depicted the first- and second-time span, and depicted the first and second duration good and bad are covering.

In another embodiment, the routing module is routed to the second communication equipment from the user data that the first communication equipment receives via the communication network that is coupled to the described base station by airlink during the described second period, characterized in that, the first period is described in terms of the first mode of operation and the second period described corresponds to the second mode of operation, and the base station described also includes a mode control module is used to switch between the first and second modes of operation that have been described.

In another embodiment, a multi-hop wireless relay communications system is characterized by the use of a downlink data transmission, characterized in that, the base station and one or more relay stations make up the aforementioned communication system, in which, the base station and relay station are both node devices that come equipped with a routing database where corresponding relationships can be stored, wherein the user terminal's connection identifier and the sign of the next jumping relay station are included in this corresponding relation and store the ID of the trace route path, wherein the ID is used in the routing database and protects against the possibility that the Hub gadget is looked through the client terminal association identifier in the plummeting media access control convention information cell MPDU bundle header in said directing data set, characterized in that, the routing database contains this connection identifier, wherein the node device is in line with the corresponding relation and the descending MPDU is sent to all next jumping relay stations that obtain, up until the user terminal, after obtaining all corresponding signs of this connection identifier.

In another embodiment, characterized in that, the routing update message is sent to the next-hop node equipment in the base station, wherein the routing update message is used to update the self-routing database and the user terminal's connection passes through the information of the next-hop node equipment to the purpose website, according to the routing update message, wherein the self-corresponding routing database is updated whenever a routing update message is received and the self-node device's information is included in the routing update message that is deleted, and a new routing update message is generated and sent to next-hop node equipment up to the goal website.

FIG. 2 is a flowchart illustrating the operation of the system. At step (202) the method (200) includes managing virtual buffer zones for nodes in the MANET using a virtual buffer zone manager (VBZM).

At step (204) the method (200) includes using an Ad-hoc On-demand Distance Vector (AODV) routing protocol that includes a virtual buffer zone update message (VBZU).

At step (206) the method (200) includes defining a virtual buffer zone for each node in the MANET, the size of which is determined based on the node's transmission range and the density of the network.

At step (208) the method (200) includes periodically updating the virtual buffer zones of all the nodes in the MANET based on their mobility patterns and network topology changes.

At step (210) the method (200) includes broadcasting a VBZU message to all the nodes within a node's virtual buffer zone upon detecting a change in the network topology, the VBZU message containing the node's ID, the size and location of its virtual buffer zone, and a timestamp indicating the time of the message transmission.

At step (212) the method (200) includes updating routing tables in each node in the buffer zone upon receiving the VBZU message by marking the affected routes as invalid and initiating a route discovery process.

The present invention provides a system for reducing rerouting time in MANETs using a virtual buffer zone technique. The system includes a plurality of nodes, each having a virtual buffer zone, which is a buffer area around the node. When a node detects a change in the network topology, it broadcasts a message to all the nodes within its virtual buffer zone. The nodes in the buffer zone update their routing tables accordingly, which reduces the rerouting time in the network.

The system uses a modified version of the ad-hoc on-demand distance vector (AODV) routing protocol, which includes a virtual buffer zone update (VBZU) message. The VBZU message contains information about the node's virtual buffer zone, such as its size and location, and is broadcast to all nodes within the buffer zone.

The virtual buffer zone is a circular area around each node, and its size is determined based on the node's transmission range and the density of the network. The virtual buffer zone manager (VBZM) is responsible for managing the virtual buffer zones of all the nodes in the network. The VBZM periodically updates the virtual buffer zones of all the nodes in the network based on their mobility patterns and network topology changes.

When a node detects a change in the network topology, such as a link failure or node mobility, it broadcasts a VBZU message to all the nodes within its virtual buffer zone. The VBZU message contains the node's ID, the size and location of its virtual buffer zone, and a timestamp indicating the time of the message transmission. Upon receiving the VBZU message, each node in the buffer zone updates its routing table by marking the affected routes as invalid and initiating a route discovery process. This process reduces the rerouting time in the network, as the nodes are already aware of the changes in the network topology and can quickly find alternative routes.

The VBZM periodically updates the virtual buffer zones of all the nodes in the network based on their mobility patterns and network topology changes. The size of the virtual buffer zone can be adjusted based on the density of the network and the transmission range of the nodes. The VBZM also monitors the network for any congested areas and can adjust the size of the virtual buffer zone accordingly to avoid packet collisions and reduce network congestion.

In another embodiment, a method that is used in the ad hoc deployed wireless networks routing packets for supporting a plurality of wireless devices comprises receiving user grouping to the location in the first base station, characterized in that the, identifier of the second wireless device is included in the user grouping that is sent by the first wireless device that is associated with the first base station and the second wireless device that is intended to be associated with the second base station. Then, confirming the aforementioned second base based on the identified second wireless device, characterized in that, each wireless device in said ad hoc deployed wireless networks is kept current by the contingency table, which uses the first base station's contingency table to confirm that the second base station uses the first base station's contingency table, Thereafter, forming the encapsulation user grouping by the user grouping that receives the encapsulation, which encapsulates using the header of the identifier that makes up the second base station, and connect the second base station's user grouping to the encapsulation.

Yet, in another embodiment, said steering update sign involves the quantity of way that necessities increment, the way list that requirements increment, and the said way list that necessities to increment contains following all or part data: whether the path of increase is a new path, whether the path of increase is created using the original ID of the trace route, whether the path of increase is created using the ID of the trace route, the portion that includes connection identifier tabulation, whether the new path and the original path overlap the same paths, the relay station number that increases, and the relay station that increases identify, characterized in that, the number of paths to delete, the list of paths to delete, and the said list of paths to delete include: the entire ID of the trace route path needs to be removed, or, the appointment's connection identifier needs to be removed from the specified path, or, need all association identifier aside from that determining association identifier in the cancellation determined way, or, keep this ID of the trace route path but delete all connection identifiers in the specified path.

In summary, the present invention provides a system for reducing rerouting time in MANETs using a virtual buffer zone technique. The system uses a modified version of the AODV routing protocol, which includes a virtual buffer zone update message. The virtual buffer zone technique reduces rerouting time and packet loss in the network, improves network performance, and is easy to implement and scalable. The VBZM manages the virtual buffer zones of all the nodes in the network, periodically updates them based on network topology changes and mobility patterns, and can adjust the size of the virtual buffer zone to avoid congestion and collisions in the network.

The congestion control algorithm/technique is designed to manage the flow of data packets through the network by dynamically adjusting the size of the virtual buffer zone (VBZ) associated with each node in the Mobile Ad-hoc Network (MANET) based on network conditions such as link quality, congestion level, packet loss rate, and available bandwidth.

When a node in the MANET receives a data packet, the congestion control algorithm determines the destination address for the packet and selects a next hop node for routing the packet towards the destination using a distance metric and the VBZ associated with each node. The VBZ defines a virtual boundary around the node within which the node can temporarily store data packets during congestion.

The congestion control algorithm then determines the number of data packets currently in the buffer zone associated with the next hop node, estimates the available bandwidth between the node and the next hop node, and determines whether the buffer zone of the next hop node is congested based on a congestion threshold. The congestion threshold is dynamically adjusted based on the estimated available bandwidth.

If the buffer zone of the next hop node is congested, the congestion control algorithm reduces the size of the buffer zone by a congestion factor that is proportional to the number of data packets in the buffer zone and the estimated available bandwidth. This helps to prevent further congestion by limiting the number of packets that can be stored in the buffer zone.

On the other hand, if the buffer zone of the next hop node is not congested, the congestion control algorithm increases the size of the buffer zone by a growth factor that is proportional to the number of data packets in the buffer zone and the estimated available bandwidth. This allows the node to temporarily store more packets during periods of low congestion and ensure faster packet delivery.

Finally, the congestion control algorithm forwards the data packet to the selected next hop node for routing towards the destination address.

Overall, the congestion control algorithm helps to improve the efficiency and reliability of data packet routing in the MANET by dynamically adjusting the size of the VBZ based on network conditions, and using a congestion threshold and growth/congestion factor to prevent or mitigate congestion at the nodes.

Figure 3:
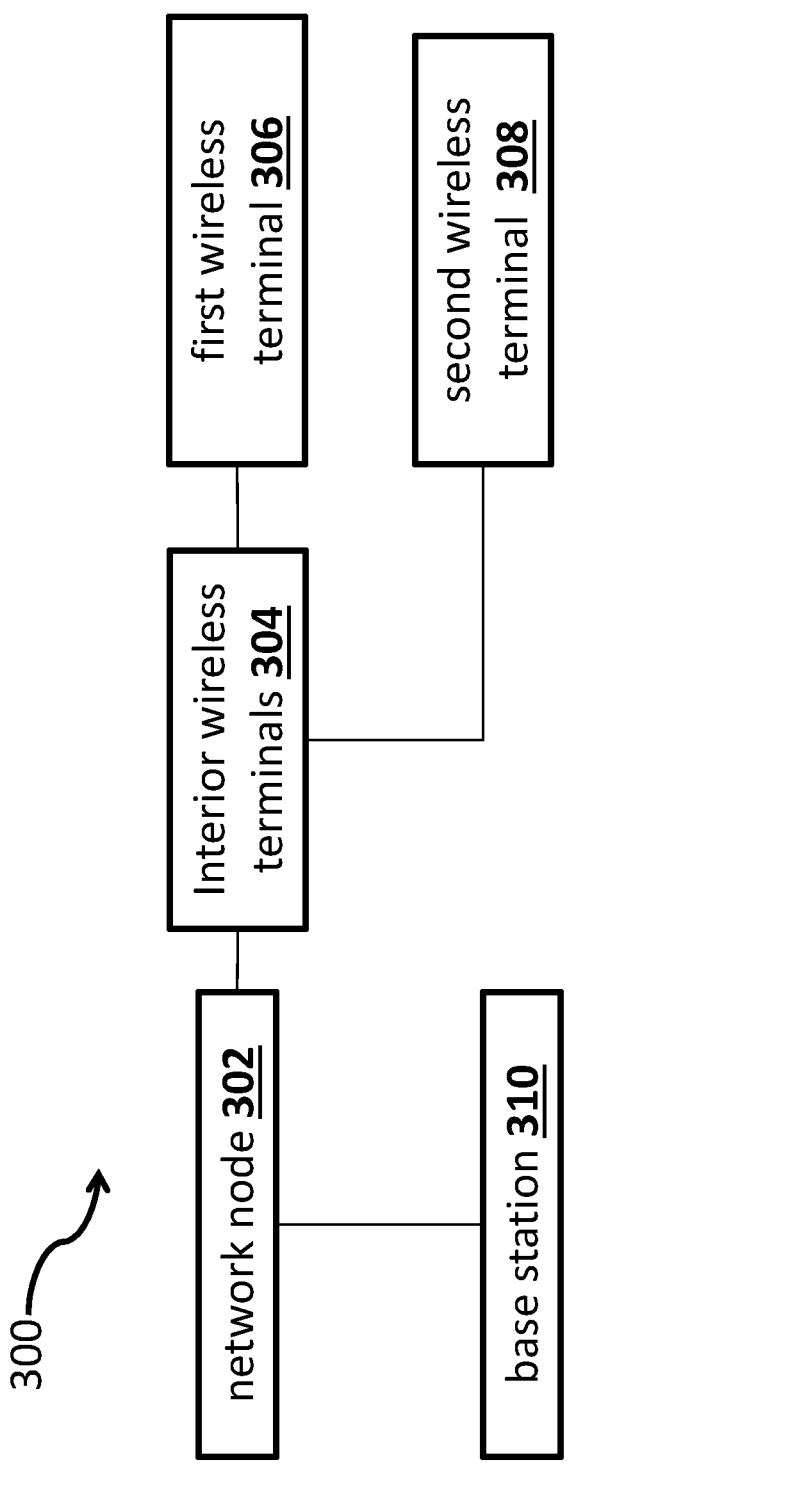
FIG. 3 is a block diagram that realizes according to various embodiment based on the communication of access point and the example communication system of peer-to-peer communications.

FIG. 3 is a block diagram that realizes according to various embodiment based on the communication of access point and the example communication system of peer-to-peer communications. FIG. 3 depicts various embodiment supports based on peer-to-peer communications between access nodes and the example communication system 300. Through a wire link, such as the internet, infrastructure base station 108 is coupled by network node 302. Interior wireless terminals 304, such as the first wireless terminal 306 and second wireless terminal 308, provide service to the geographic area via the infrastructure frequency band, which is a spectrum's described wireless bands.

But the foundation recurrence band, likewise plausibility and one more unique otherworldly group that is known as the no infrastructure recurrence band that really has once in a while can be for the remote terminals in a similar geographic region. As a result, the wireless terminals can take part in the session of self-organizing peer-to-peer communications by making use of the no infrastructure frequency band.

The described infrastructure base station transmits the beacon signal in the infrastructure frequency band in the exemplary embodiment. The described beacon signal is just a small portion of a distinct signal with the fewest transmission units overall in the spectrum that can be used. The term "beacon signal" refers to one or more bursts of beacon signals that are part of a sequence, and each burst contains at least one beacon symbol. Take the sub-fraction of the total minimum transmission units in the usable spectrum air link resources corresponding to all beacon symbols of the beacon signal in some embodiments, for instance, and limit it to no more than 0.1%. The minimum unit for the air link resources of communication is the minimum transmission unit. In an illustration of a Frequency Division Multiplexing system, the single frequency on the symbol transmission period is transferred into minimum transmission units, which are sometimes referred to as frequently accent-code elements. Moreover, the information of the normal send force of all guide images of reference point signal proportion each base transmission units when terminal transmitter is in the overall information meeting and the normal communicate force of control signal are a lot higher, for instance high something like 10 dB or if nothing else 16 dB.

Moreover, in specific encapsulations, the framework data that the foundation base station 310 is with containing that recurrence (for instance transporter wave) position that contains the non-infrastructure groups of a range or potentially the COS that gives are given the transmission divert of reference point signal in this recurrence band for instance TDD (time division duplex) or impromptu systems administration.

The operational reason that one group of different bands of a spectrum is arranged in different zones but available in another zone is because certain bands of a spectrum may be assigned to other services in a particular geographic area. When a wireless terminal moves between regions A and B, it must first fully understand which bands of the spectrum are available so that it does not disrupt or destroy existing service.

According to some embodiment, a near-dedicated transmitter transfer system beacon signal is operational in each band of a spectrum's residing geographic area to assist wireless terminals in fully comprehending the availability of spectrum in the given area. Reference point signal is a small part of a sort of unmistakable sign that takes the complete least transmission units in the usable range. Minimum transmission units are the minimum unit for the communication resource, and in some embodiments, the beacon symbols of the beacon signal took no more than 0.1% of the total usable spectrum air link resources. Minimum transmission units are the single frequency that is transferred during the symbol transmission period in some examples of Frequency Division Multiplexing (OFDM) systems, which frequently transfers code elements.

When the transmitter is in the general data session, the average transmit power of each minimum transmission unit's beacon symbols is significantly higher than the average transmits power of the control signal and data, for example by at least 10 dB in some embodiments. When the transmitter is in the general data session, the control signal average transmits power height and the data of the beacon signal beacon symbols transmitting power of every minimum transmission unit ratio must at least be 16 dB.

The first mobile node is this wireless terminal, and the second mobile node is another piece of communication equipment that takes part in the first mobile node's peer-to-peer communications session. Base stations, dedicated beacon transmitters, and satellites are the first pieces of communication equipment. They provide the reference information that wireless terminals and other pieces of communication use. First signal is a burst OFDM beacon signal launched in the first frequency band that includes at least one beacon symbol and frequently transfers high energy, for example. The non-beacon broadcast signal, for instance, that is sent by the initial communication equipment is an additional signal. Get from first transmission concerning time base data, and be utilized for discovering that remote terminal is from other remote terminals - - - for instance peer gadget gets the hour of reference point signal, and is utilized for deciding communicating the hour of its oneself client's guide signal. The OFDM user's beacon signal, which consists of at least one beacon symbol, bursts as the secondary signal. The described beacon symbols will generate as a result of becoming part of the identifier that is associated with the wireless terminal or wireless terminal user. Remote terminal is determined the second correspondence recurrence band from got first transmission, and this correspondence band is to be utilized to the correspondence band of shared interchanges, and it involves the transmitting recurrence of the client's guide that will be created by remote terminal. The first and second communication bands are overlapping in this embodiment. In this manner, to be conveyed to indistinguishable recurrence band with the companion clients information be in the second correspondence recurrence band to client's guide of remote terminal. The time jump input control parameter is transmitted in the sequence, and the first and second parameters are linked to the user's wireless terminal-generated beacon signal. For instance, sign or an idea that time might be given in the first and second boundaries, and one more can furnish the identifier that is related with transmitter. The wireless terminal causes the beacon to burst in a relative position in the time window to burst to the next beacon from a beacon and jump when carrying out the operation in accordance with the jump sequence that is described for the input control parameter.

Figure 4:
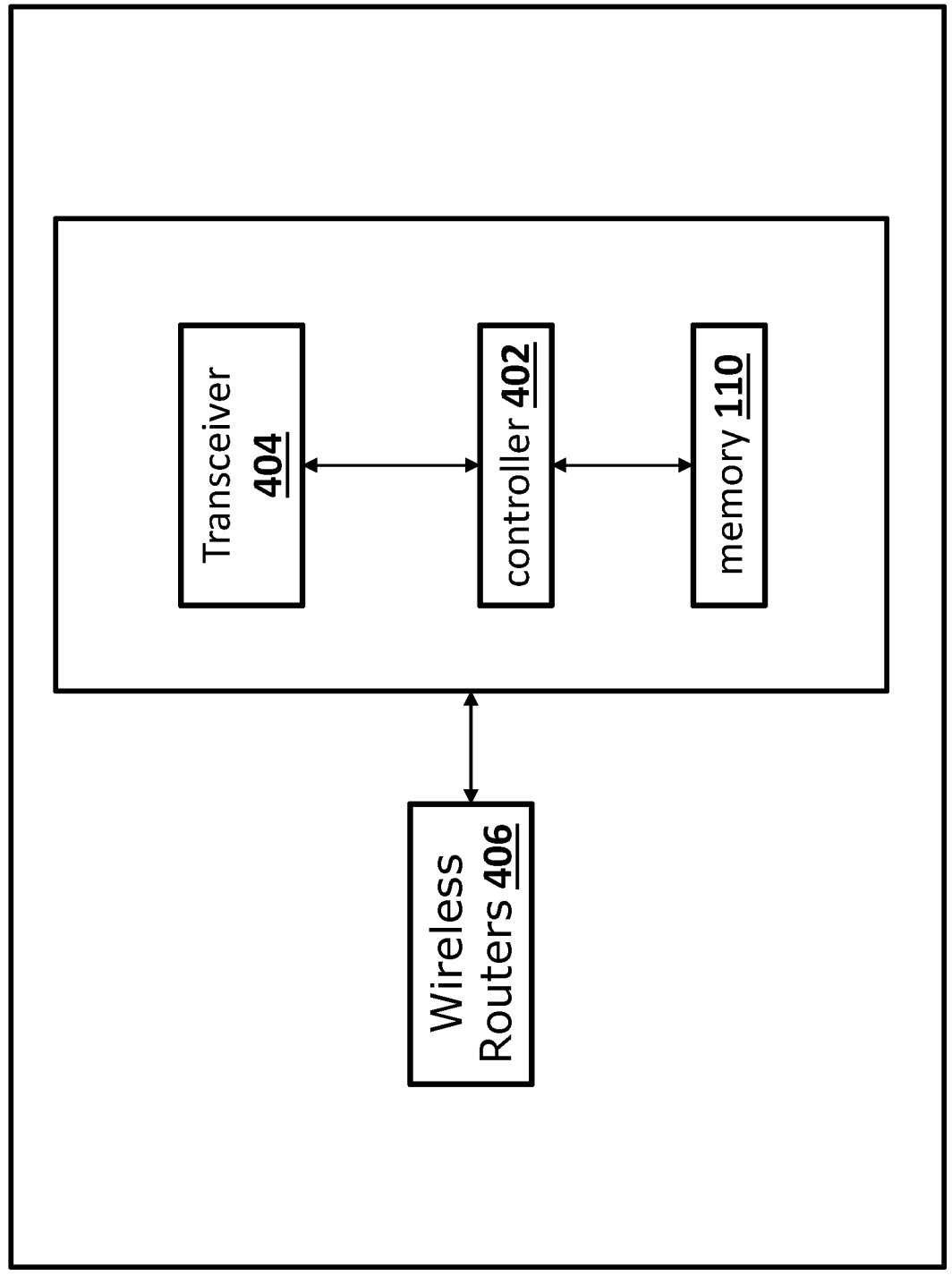
FIG. 4 is a block diagram illustrating an example of a node employed in the network.

FIG. 4 is a block diagram illustrating an example of a node employed in the network. Every hub incorporates a handset, or modem, which is coupled to a receiving wire and is fit for getting and communicating signals, for example, packetized information, to and from hubs heavily influenced by a regulator. The packetized data can include information for updating the network topology, such as voice, general data or multimedia, and packetized control signals.

Each node also has a memory 110, such as a random-access memory 110 (RAM), that can store routing information about itself and other nodes in the network, among other things. The nodes have the option of including a controller 402 that can be any combination of any number of devices, including a notebook or palm computer, mobile telephone unit, mobile data unit, or any other device that is suitable. Nodes, which only perform routing, do not require a computing device to function within the network. Every hub additionally incorporates the suitable equipment and programming to perform Web Convention (IP) and Address Goal Convention (ARP), the reasons for which can be promptly valued by one gifted in the craftsmanship. Transmission control protocol (TCP) and user datagram protocol (UDP) hardware and software may also be included. It should be noted that the term "node" is used multiple times in the following description, and it can be used to refer to any of the nodes that were mentioned earlier, if necessary.

In this regard, the subscriber device's radio interface is the transceiver 404, which is in charge of sending and receiving digital signals. For proper wireless data transfer with other Subscriber Devices, Wireless Routers 406, or Access Points, the CPU component ensures that all command-and-control operations are carried out. The software that controls how the transceiver 404 works and moves data between the transceiver 404 and the controller 402 is in the memory component. The device can be connected to palm or portable computers via the high-speed bus.

When wireless nodes are dispersed, a device known as a Wireless Router is typically utilized to provide connectivity. In this regard, even if the network only has one Subscriber Device, the installation of Wireless Routers guarantees that at least a minimal amount of coverage will be provided. Remote Switches are commonly utilized, in such manner, for retransmitting information over a remote connection point.

A Passage gadget is a gadget that gives the extension between the remote organization and land organizations (such as, PSTN, Web, LAN, and WAN). Passageways that help remote connection points are like Endorser Gadgets and Remote Switches, in such manner, in that they have a handset, a central processor part, and a memory part. The Access Point Computer can be connected to global networks with proper wired or fibre associations. Wireless routers can be fixed, portable, or mobile, while Subscriber Devices can freely move within serviced areas.

Ad-hoc multihopping networks differ from cellular networks in that their members—such as Subscriber Devices, Wireless Routers, and Access Points—provide relay services to all neighbours, ensuring that all data packets generated at a source are received at a destination. This handing-off capacity broadens the inclusion regions related with Passageways to a lot bigger distances than would exist in a cell framework. Besides, the improved inclusion region is accomplished for a minimal price. In such manner, on the grounds that the gadgets in an impromptu multihopping network utilize tiny measures of send power, the gadgets can be worked for quite a while on batteries. Additionally, the devices are suitable for use in non-licensed frequency bands due to their low transmit energy consumption.

The architecture of ad-hoc multi-hopping networks differs from that of cellular networks as well. A base station, also known as "the cell," acts as the network's central hub and activity coordinator in a cellular network. In such manner, in light of the fact that phone correspondence happens between one hub (the base station) and numerous different hubs (the hubs), one recurrence can be utilized for moving information from the base station to the organization of hubs and one more recurrence can be utilized for moving information from hubs to the base station. The way of such cell correspondence, in such manner, is like correspondences utilizing satellites. From this vantage point, a cellular network's architecture is asymmetric, with the base station transmitting on a single frequency and all subscribers transmitting on a different frequency. The Base Station and Mobile Subscriber are able to transmit and receive data simultaneously thanks to this architecture and the significant difference between uplink and downlink frequencies.

With the exception of the source and destination nodes, nodes in ad-hoc multihopping networks ought to act as repeaters, retransmitting data packets. This mode of operation, which satisfies some optimization and operation criteria by consuming the least amount of energy, necessitates the identification of routes between the source and destination because the majority of nodes run on batteries. Because each node could be a source, destination, or intermediate node simultaneously, it is necessary for all nodes to transmit and receive on the same frequency in order to guarantee multihopping capability. Thus, a hub working in an impromptu multihopping network for the most part will be unable to communicate and get in a similar time. It must switch between sending and receiving signals.

Ordinary Strategies

One normal technique utilized in impromptu multihopping correspondence is CSMA/CA. In order to set the parameters of the communication, this method, which was developed for use in military applications, necessitates the exchange of Ready to Send (RTS) and Clear to Send (CTS) messages. When the RTS-CTS "handshaking" is fruitful, information is moved utilizing the qualities that were chosen during the handshake. The data recipient can respond to the data transfer with an "Acknowledgment" that identifies the received data's correctness or incorrectness. In this regard, the CSMA/CA method requires that every node listen for a potential radio communication before sending data (Carrier Sensing).

Time Balance

Control or configuration messages must be exchanged in order for two nodes in an ad hoc multihopping network to communicate. These setup messages give the "handshaking" that guarantee that the communicating hub and the getting hub are tuned on to a similar recurrence channel, utilizing similar spreading codes and a similar balance. After the correspondence of information is finished, the getting hub can affirm the nature of the gathering through one more communicated control message.

When data packets are very large and the delay along the multihopping route is not important, the method may add a small amount of overhead information to the main data traffic. However, when the communication is interactive and only requires a small pipeline delay, the situation may be different.

For instance, Voice Over Internet Protocol (VOIP) is a service that is interactive and has a small delay for complete communication. An analog-to-digital converter is used to digitize a sound, a pipe is used to move data from one location to another, and a digital-to-analog converter is used to recreate the sound.

The buffering time of a data packet and the delay at each node along the delivery route determine the total amount of time that passes between the moment the sound is generated at the source and the moment the sound is regenerated at the destination. In this context, the time required to collect data for a single packet is referred to as the "buffering time" of that packet. While decreasing the packet's duration has the effect of reducing the buffering delay per packet, increasing the number of packets per second results in an increase in overhead. As long as it is less than the amount of data a node can handle, the increased overhead has no effect on communication.

Figure 5:
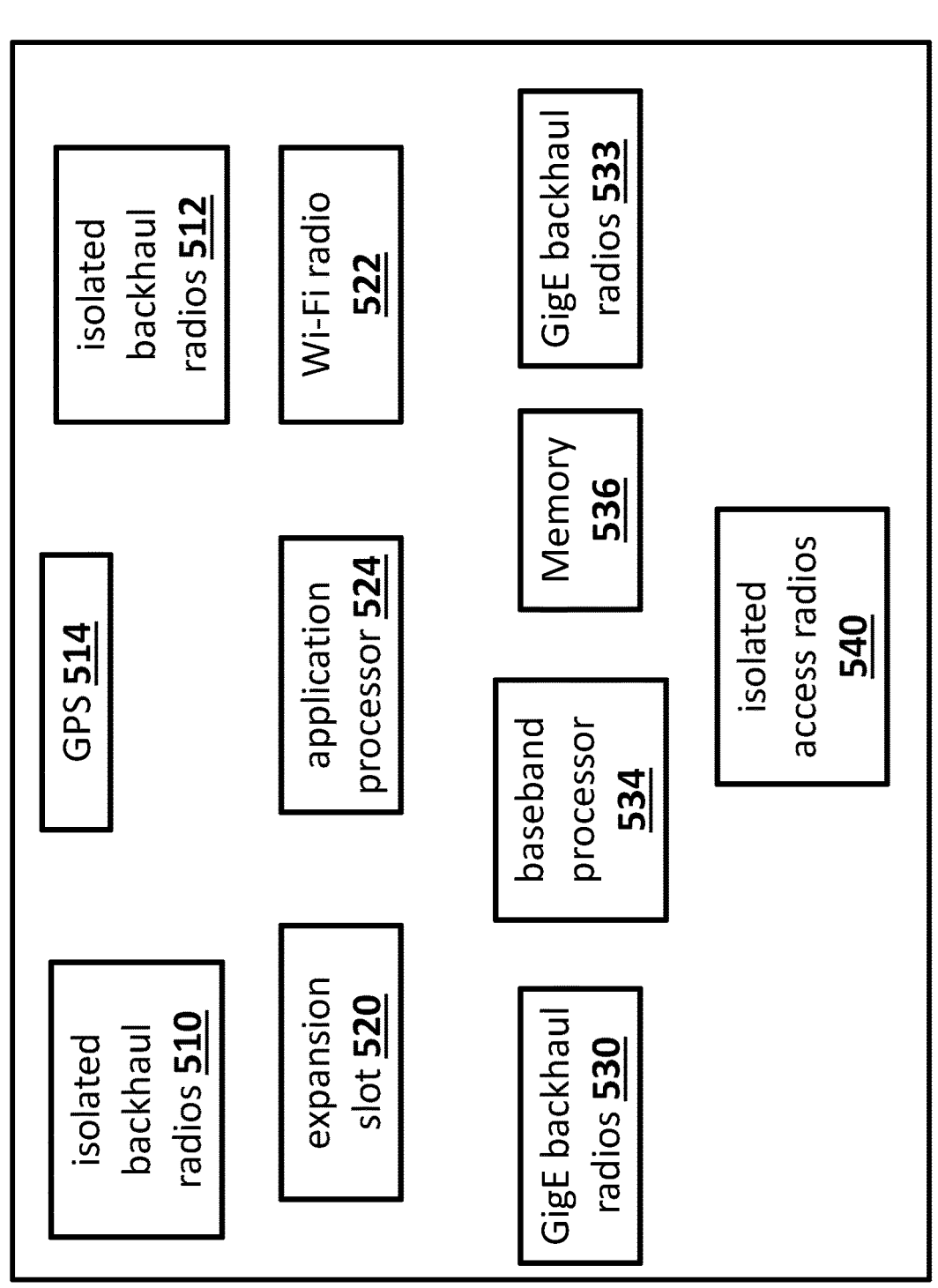
FIG. 5 is an architectural rendering of an ad hoc cellular base station upon which methods of the present invention can be executed.

FIG. 5 is an architectural rendering of an ad hoc cellular base station upon which methods of the present invention can be executed. The architectural diagram in FIG. 5 depicts an ad hoc cellular base station with a computer-readable medium on which method embodiments can be stored and carried out on the hardware depicted.

Alluding to FIG. 5 shows two isolated backhaul radios 510, 512, a GPS receiver connected to a GPS antenna, or "GPS" 514, a Wi-Fi radio 522, an application processor 524, a baseband processor 534, a memory 536, two additional backhaul radios 530, 532, which could be a 10 Gigabit Ethernet backhaul, an expansion slot 520, and isolated access radios 540. The ad hoc base station 500 is also shown the application processor 524 could store only a little of the core network functionality. Isolated backhaul radios 510, 512 and isolated access radios 540, as previously mentioned, can be hardware configured to transmit in at least one of the following categories: Wi-Fi, high-speed Wi-Fi, satellite, Bluetooth, ZigBee, FDD, TDD, full duplex, wired or wireless backhaul, licensed and unlicensed spectrum, 2G, 3G, 4G, LTE, Wi-Fi, TV white space, and LTE.

In certain encapsulations and without limit, equipment setups could be as per the following. At the very least, one access radio 540 might be a 20 MHz 22 MIMO LTE radio that uses 1 W of power to transmit. A 33 MIMO WPA 2 Enterprise Wi-Fi access radio could be a second access radio 540. One type of backhaul radio 510 could be a multi-radio mesh with up to three MIMO, 40 MHz of bandwidth, and enterprise-grade WPA 2 encryption. Cellular backhaul radios are another type of backhaul radio. Antennas and connectors for long-distance link support could also be included in the ad hoc cellular base station. Antennas could be omnidirectional, segmented, or high gain/narrow beam in some incarnations. The application processor 524 has limited capacity for application servers and core functionality. The ad hoc mobile cellular base station can be attached to a person, an animal, an airplane, a drone, a helicopter, a hot air balloon, a train, a motorcycle, a snowmobile, or any other moving object in the embodiments described herein.

One or more of the following network operation functions might be included in the limited core network functionality: paging, handover, verification, area the executives, SGW choice, radio asset the board, versatility the executives, meandering administration, following region the board, portability anchor, legitimate capture attempt, strategy requirement, parcel separating, charging, or giving an anchor among 3GPP and non 3GPP advances.

The present invention provides several advantages over existing routing protocols for MANETs. Firstly, the virtual buffer zone technique reduces rerouting time and packet loss in the network, thereby improving the network performance. Secondly, the system is easy to implement and does not require significant changes to the existing routing protocols. Thirdly, the system is scalable and can be used in networks of various sizes. The advantages are provided below.

Faster route discovery: The use of virtual buffer zones and the VBZM allows for more accurate and efficient route discovery, reducing the time it takes to find the best route for data packets.

Reduced packet loss: By using a congestion control technique to adjust the virtual buffer zone size, the system can prevent packet loss due to congestion and ensure that data packets are delivered more reliably.

Improved network efficiency: By adjusting the virtual buffer zone size dynamically based on network conditions, the system can optimize the use of available bandwidth and reduce routing overhead, leading to improved network efficiency.

Improved reliability: By reducing the frequency of route changes and packet losses, the system can improve the overall reliability of the MANET, making it more suitable for mission-critical applications such as military operations or disaster management.

Improved scalability: The use of virtual buffer zones and the VBZM allows the system to scale to larger MANETs more effectively, since it can adjust to changing network conditions and optimize the use of available bandwidth. FIG. 6 provides a table illustrating various results and advantages obtained using the present invention.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. A system for reducing rerouting time in a mobile ad-hoc network (MANET), comprising:

at least one hardware processor; and memory having program instructions stored thereon executable by the at least one hardware processor that, when executed, directs the at least one hardware processor to:

manage virtual buffer zones for a plurality of nodes in the MANET, each of the plurality of nodes having a virtual buffer zone that defines a circular area around each of the plurality of nodes in the MANET, wherein a size of the virtual buffer zone is determined based on a node transmission range of individual ones of the plurality of nodes and a density of the MANET;

store a plurality of routing tables and virtual buffer zone information;

receive a data packet at one of the plurality of nodes in the MANET;

determine a destination address for the data packet and determine a next hop node for the data packet based on an ad-hoc on-demand distance vector routing protocol, wherein the virtual buffer zone associated with each of the nodes in the MANET defines a virtual boundary around each of the nodes within which a respective node temporarily stores data packets during congestion conditions;

direct each of the plurality of nodes in the MANET to dynamically adjust the size of the virtual buffer zone based on network conditions to prevent congestion and packet loss;

direct each of the nodes in the MANET to implement a congestion control technique that adjusts the size of the virtual buffer zone based on a number of data packets in the virtual buffer zone and an estimated available bandwidth to prevent the congestion and packet loss, and ensure a reliable packet delivery; and forward the data packet to the next hop node as determined for routing towards the destination address.

\* \* \* \* \*